(12) United States Patent
Dollinger et al.

(10) Patent No.: US 10,085,137 B1
(45) Date of Patent: *Sep. 25, 2018

(54) METHOD AND SYSTEM FOR SHARING A TELEMATICS ACCESS POINT

(71) Applicant: CNH Industrial America LLC, New Holland, PA (US)

(72) Inventors: Tyson J. Dollinger, Mazon, IL (US); Brian R. Ray, Chicago, IL (US); Mark R. Friedenberger, North Riverside, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,435

(22) Filed: Mar. 22, 2017

(51) Int. Cl.
*H04W 4/80* (2018.01)
*H04W 4/00* (2018.01)
(Continued)

(52) U.S. Cl.
CPC ............... *H04W 4/80* (2018.02); *G06F 7/24* (2013.01); *H04W 4/008* (2013.01); *H04W 8/18* (2013.01);
(Continued)

(58) Field of Classification Search
CPC ..... H04W 88/04; H04W 88/06; H04W 88/08; H04W 88/10; H04W 88/12; H04W 88/14;
(Continued)

(56) References Cited

U.S. PATENT DOCUMENTS 7,593,999 B2   9/2009  Nathanson
7,613,564 B2  11/2009  Vorona
(Continued)

FOREIGN PATENT DOCUMENTS

JP    2004-85405 A    3/2004

OTHER PUBLICATIONS

Yilu Zhang, Xinyu Du, and Mutasim Salman, "Peer-to-peer Collaborative Vehicle Health Management—the Concept and an Initial Study", Electrical & Controls Integration Lab, GM Global R&D, General Motors Company, Warren, MI 48090, USA, Annual Conference of Prognostics and Health Management Society, 2012 (10 pages).

Carl Bergenhem, Erik Hedin, and Daniel Skarin, "Vehicle-to-Vehicle Communication for a Platooning System", SP Technical Research Institute of Sweden, Brinellgatan 4, Borås SE-504 62, Sweden, Procedia—Social and Behavioral Sciences 48 (2012), 1222-1233 (12 pages).

José Santa and Antonio F. Gómez-Skarmeta, "Sharing Context-Aware Road and Safety Information", Pervasive Computing, IEEE 8.3 (2009), 58-65 (8 pages).

(Continued)

*Primary Examiner* — Jean Gelin
(74) *Attorney, Agent, or Firm* — Rickard K. DeMille; Rebecca L. Henkel

(57) ABSTRACT

A system shares a telematics access point between agricultural or industrial machines or vehicles utilizing short-range wireless connection devices for each of the machines or vehicles. The short-range wireless connection devices create a short-range local wireless network and transmit status messages from each of the machines or vehicles, indicating whether the machine or vehicle to which each short-range wireless connection device is connected has a cellular telematics modem and an active valid subscription for cellular internet access. At least one telematics access point is chosen from among the machines or vehicles having a modem and a subscription. The wireless connection devices transmit data and informatics to the telematics access point. The telematics access point transmits the data and informatics to a back-office server using the cellular telematics modem by way of a telecommunication system.

20 Claims, 2 Drawing Sheets

(51) Int. Cl.
*H04W 8/18* (2009.01)
*H04W 48/20* (2009.01)
*G06F 7/24* (2006.01)
*H04W 84/12* (2009.01)
*H04W 84/18* (2009.01)
*H04W 88/04* (2009.01)
*H04W 4/70* (2018.01)

(52) U.S. Cl.
CPC .............. *H04W 48/20* (2013.01); *H04W 4/70* (2018.02); *H04W 84/12* (2013.01); *H04W 84/18* (2013.01); *H04W 88/04* (2013.01)

(58) Field of Classification Search
CPC ... H04W 72/005; H04W 88/02; H04W 84/12; H04W 84/18; H04W 48/20; H04W 4/008; H04W 8/18
See application file for complete search history.

(56) References Cited

U.S. PATENT DOCUMENTS

| | | | |
|---|---|---|---|
| 7,693,612 B2 | 4/2010 | Bauchot et al. | |
| 7,778,752 B1 | 8/2010 | Hunt et al. | |
| 8,170,747 B2 | 5/2012 | Chen et al. | |
| 8,213,861 B2* | 7/2012 | Tengler | H04L 67/14 455/41.1 |
| 8,447,804 B2 | 5/2013 | Bai et al. | |
| 8,676,920 B2 | 3/2014 | Bai et al. | |
| 8,682,573 B2* | 3/2014 | Anderson | G01C 21/3492 701/439 |
| 8,768,537 B2 | 7/2014 | Kim et al. | |
| 2005/0216151 A1* | 9/2005 | Gawlik | G07C 5/008 701/31.4 |
| 2005/0240343 A1* | 10/2005 | Schmidt, II | G07C 5/008 701/414 |
| 2007/0006098 A1* | 1/2007 | Krumm | G06F 17/3087 715/825 |
| 2009/0221279 A1* | 9/2009 | Rutledge | H04M 1/72577 455/418 |
| 2010/0240299 A1 | 9/2010 | Karino | |
| 2012/0265977 A1* | 10/2012 | Ewell, Jr. | G06F 1/1626 713/100 |
| 2013/0238441 A1* | 9/2013 | Panelli | B60Q 1/503 705/14.62 |
| 2014/0019167 A1* | 1/2014 | Cheng | G06Q 40/08 705/4 |
| 2014/0045477 A1* | 2/2014 | Ewell, Jr. | H04W 4/027 455/418 |
| 2015/0099480 A1* | 4/2015 | Reiter | H04M 1/72577 455/404.1 |
| 2016/0132530 A1* | 5/2016 | Misu | G06F 17/30241 701/408 |
| 2016/0189423 A1* | 6/2016 | Kaeser | G06F 3/012 345/420 |
| 2017/0188168 A1* | 6/2017 | Lyren | H04S 1/007 |
| 2017/0210288 A1* | 7/2017 | Briggs | B60Q 9/00 |

OTHER PUBLICATIONS

"TropOS 4319-XA Mobile Router", ABB, 2013 (4 pages).
Lucas Wang, Ryuji Wakikawa, Romain Kuntz, Rama Vuyyuru, and Lixia Zhang, "Data Naming in Vehicle-to-Vehicle Communications", Computer Science Department, University of California, Los Angeles, and Toyota InfoTechnology Center, USA Mountain View, CA, 2013 (6 pages).

* cited by examiner

METHOD AND SYSTEM FOR SHARING A TELEMATICS ACCESS POINT

BACKGROUND OF THE INVENTION

1. Field of the Invention

The present invention relates to vehicle telematics, and, more particularly, to a system used in a farming or industrial environment that allows at least one agricultural or industrial machine or vehicle without direct access to a telecommunication system to transfer vehicle informatics through at least one vehicle that is equipped to access the telecommunication system.

2. Description of the Related Art

Vehicle telematics is a term that describes the use of vehicle electronic systems and various types of wireless communication to transmit, receive, and/or store vehicle informatics between vehicles and between vehicles and physical or electronic infrastructure. Telematics may further involve controlling one or more vehicles or vehicle subsystems remotely. Conversely, telematics may involve various levels of cooperation and control between vehicles, vehicle subsystems, and physical or electronic infrastructure. Informatics transmitted, received, and/or stored between vehicles and/or between vehicles and physical or electronic infrastructure may include, by way of non-limiting example, fleet, vehicle, and/or load status and/or tracking information; operating hours, fuel and other consumables status; maintenance, diagnostics, and/or prognostics information; environmental, emergency, hazard, and/or safety information; insurance, licensure, and/or authorization information; and/or social or entertainment information. The use of such telematics capabilities with agricultural or industrial machines or vehicles is rapidly becoming more prevalent in the agricultural or industrial industry as the potential benefits of such systems are demonstrated and realized. As telematics modules become increasingly integrated with vehicle and implement electrical and electronic systems and/or subsystems, more of this data and information may be logged and transmitted for analysis using stationary electronic and computer infrastructure. Such analysis may be for the purpose of increasing efficiency and/or managing vehicle maintenance, as non-limiting examples.

A typical telematics systems is equipped with a cellular telematics modem, which allows the telematics system to receive internet access via a mobile broadband connection. This allows the telematics system to transmit logged or real-time data to a stationary or "back-office" server for analysis, and/or to receive information and/or instructions from the back-office server. In order to obtain access by way of the cellular telematics modem to the telecommunication system and thereby to the internet, it is generally necessary for the operator or fleet manager to maintain a subscription for each such cellular telematics modem with the telecommunication company for cellular internet access. Often agricultural or industrial operations involve the use of numerous agricultural or industrial machines or vehicles which may benefit from or even require telematics capabilities. Equipping each and every such agricultural or industrial machine or vehicle in a fleet with a cellular telematics modem and a subscription to support it, therefore, is often prohibitively expensive for a fleet owner or manager.

Accordingly, what is needed in the art is a way to provide telematics capabilities and access to numerous agricultural or industrial machines or vehicles in a given fleet without requiring each agricultural or industrial vehicle to be equipped with a cellular telematics modem and/or a subscription for cellular internet access.

SUMMARY OF THE INVENTION

The present invention is a method and system for sharing a telematics access point that is used on agricultural or industrial machines and vehicles in the farming environment, and provides such a way to give telematics capabilities and access to numerous agricultural or industrial machines and vehicles in a fleet without requiring each agricultural or industrial machine and vehicle to be equipped with a cellular telematics modem and/or a subscription for cellular internet access. The present invention allows the transmission of vehicle informatics from the agricultural or industrial machines and vehicles not having direct access to the telecommunication system by way of at least one of the agricultural or industrial machines or vehicles that is equipped with a cellular telematics modem and that has a subscription for cellular internet access, to a stationary or back-office server for analysis.

In one embodiment of the present invention, a team of agricultural or industrial machines and vehicles connects by way of a short-range local wireless network, wherein at least one of the agricultural or industrial machines or vehicles is equipped with the cellular telematics modem and has an active valid subscription for cellular internet access. This short-range local wireless network may include any type of short-range wireless connection device capable of transmitting and receiving data, such as Bluetooth, Personal Area Network (PAN), Wireless Sensor Network (WSN), or Wireless Local Area Network (WLAN/Wi-Fi), as non-limiting examples. Other short-range wireless connection devices contemplated may include forms of non-radio communication, such as infra-red (IR) data communications, as a non-limiting example. Further, the short-range local wireless network may utilize a self-forming wireless mesh network using the Industrial, Scientific, and Medical (ISM) radio band of the radio frequency (RF) spectrum. In this way, the agricultural or industrial machines or vehicles, including those without a cellular telematics modem and/or without an active valid subscription for cellular internet access onboard, are able to gain the full functionality of telematics capability by transmitting vehicle informatics and/or receiving receive information or instructions via the short-range local wireless network from the at least one agricultural or industrial machine or vehicle that is equipped with a cellular telematics modem and that has a subscription for cellular internet access. The at least one agricultural or industrial machine or vehicle with the cellular telematics modem and active valid subscription for cellular internet access then becomes the telematics access point, and relays all vehicle data and other informatics to the back-office server.

The vehicle data and informatics transmitted to the agricultural or industrial machine or vehicle acting as the telematics access point may be transmitted by the agricultural or industrial machines or vehicles not having direct access, either in real-time or as logged data. The agricultural or industrial machine or vehicle acting as the telematics access point may further be provided with a means to sort and prioritize the data and informatics, such as a processor and temporary electronic storage, or an electronic control unit, before transmitting it by way of the cellular telematics modem and telecommunication system to the back-office server. The agricultural or industrial machine or vehicle acting as the telematics access point may, therefore, further transmit the data and informatics in real-time or as logged data and informatics to the back-office server. Similarly, the agricultural or industrial machine or vehicle acting as the telematics access point may transmit the information and/or instructions from the back-office server to the agricultural or industrial machines or vehicles not having direct access, either in real-time or as logged information and/or instructions, by way of the short-range local wireless network.

According to one embodiment of the present invention, once each agricultural or industrial machine or vehicle is connected to the short-range local wireless network of the team of agricultural or industrial machines or vehicles, it sends a status message to inform all agricultural or industrial machines or vehicles that are members of the team whether or not it has a cellular telematics modem and an active valid subscription for cellular internet access. Upon receiving this status message, at least one of the agricultural or industrial machines or vehicles with a cellular telematics modem and an active valid subscription for cellular internet access is chosen to be the telematics access point for the team of agricultural or industrial machines and vehicles. In an embodiment of the present invention wherein more than one of the agricultural or industrial machines or vehicles in the team is provided with a cellular telematics modem and an active valid subscription for cellular internet access, priority may be assigned to a single agricultural or industrial machine or vehicle to act as the telematics access point for the team of agricultural or industrial machines and vehicles.

Alternately, in an embodiment of the present invention wherein more than one of the agricultural or industrial machines or vehicles in the team is provided with a cellular telematics modem and an active valid subscription for cellular internet access, each of the agricultural or industrial machines or vehicles not having a cellular telematics modem and/or an active valid subscription for cellular internet access chooses or is assigned one of the agricultural or industrial machines or vehicles in the team with a cellular telematics modem and active valid subscription for cellular internet access, and utilizes that agricultural or industrial machine or vehicle as its telematics access point. The choice or assignment of the agricultural or industrial machine or vehicle to be used as a given agricultural or industrial machine or vehicle's telematics access point may be made by one or more algorithms that attempt to establish a largely equal distribution of data and/or vehicle informatics to be transmitted and/or received by the cellular telematics modems of each agricultural or industrial machine or vehicle acting as a telematics access point.

Once the choice or assignment of the agricultural or industrial machine or vehicle to be used as a telematics access point is made, each agricultural or industrial machine and vehicle on the team that is otherwise provided with telematics functionality, but that does not have a cellular telematics modem and/or an active valid subscription for cellular internet access, begins sending its prescribed telematics data and informatics over the short-range local wireless network to its telematics access point. In order to do this, each agricultural or industrial machine and vehicle that is otherwise provided with telematics functionality, but that does not have a cellular telematics modem and/or an active valid subscription for cellular internet access, may utilize an existing wireless capability of the agricultural or industrial machine and vehicle, or may require the addition of a dedicated short-range local wireless network electronic module.

Further, in ad-hoc fashion, the team of agricultural or industrial machines and vehicles may utilize more than one form of wireless communication to form the short-range local wireless network, so that data and/or vehicle informatics may be transmitted from one agricultural or industrial machine or vehicle without a cellular telematics modem and/or an active valid subscription for cellular internet access, to another agricultural or industrial machine or vehicle without a cellular telematics modem and/or an active valid subscription for cellular internet access, before being transmitted to the agricultural or industrial machine or vehicle acting as the telematics access point, in order to make use of the existing wireless capabilities of each agricultural or industrial machine or vehicle. Note that each of the embodiments discussed thus far may involve at least one agricultural or industrial machine or vehicle that is entirely without a cellular telematics modem, and therefore entirely relies on the agricultural or industrial machine or vehicle that acts as the telematics access point to transmit data and/or vehicle telematics, and/or to receive information and/or instructions from the back-office server via the telecommunication system.

In one form, the invention is directed to a system for sharing a telematics access point between at least two agricultural or industrial machines or vehicles. The system utilizes a short-range wireless connection device for each of the at least two agricultural or industrial machines or vehicles. Each short-range wireless connection device is connected to at least one electronic system or subsystem of its agricultural or industrial machine or vehicle. The short-range wireless connection devices are configured to create a short-range local wireless network and to transmit status messages from each of the at least two agricultural or industrial machines or vehicles. The status messages indicate whether the agricultural or industrial machine or vehicle to which each short-range wireless connection device is connected has a cellular telematics modem and an active valid subscription for cellular internet access.

At least one telematics access point is chosen from at least one of the at least two agricultural or industrial machines or vehicles, the chosen agricultural or industrial machine or vehicle having a cellular telematics modem and an active valid subscription for cellular internet access. At least one of the at least two agricultural or industrial machines or vehicles that is not chosen as the at least one telematics access point does not have at least one of a cellular telematics modem and an active valid subscription for cellular internet access. The wireless connection devices are further configured to transmit at least one of agricultural machine data and informatics to the at least one telematics access point. The at least one telematics access point is configured to further transmit the at least one of agricultural machine data and informatics to a back-office server using the cellular telematics modem by way of a telecommunication system.

In another form, the invention is directed to a method for sharing a telematics access point between at least two agricultural or industrial machines or vehicles. The method includes several steps. The first step is providing a short-range wireless connection device for each of the at least two agricultural or industrial machines or vehicles, each of the short-range wireless connection devices being connected to at least one electronic system or subsystem of its agricultural or industrial machine or vehicle. The second step is providing at least one of the at least two agricultural or industrial machines or vehicles with a cellular telematics modem and an active valid subscription for cellular internet access. The third step is creating a short-range local wireless network using the short-range wireless connection devices. The fourth step is transmitting status messages from each of the at least two agricultural or industrial machines or vehicles using the short-range wireless connection devices and the short-range local wireless network, the status messages indicating whether the agricultural or industrial machine or vehicle to which each short-range wireless connection device is connected has a cellular telematics modem and an active valid subscription for cellular internet access.

The fifth step is choosing at least one telematics access point from at least one of the at least two agricultural or industrial machines or vehicles, the chosen agricultural or industrial machine or vehicle having a cellular telematics modem and an active valid subscription for cellular internet access. At least one of the at least two agricultural or industrial machines or vehicles not chosen as the at least one telematics access point does not have at least one of a cellular telematics modem and an active valid subscription for cellular internet access. The sixth step is each of the agricultural or industrial machines or vehicles not chosen as the at least one telematics access point transmitting at least one of agricultural machine data and informatics to the at least one telematics access point using the wireless connection devices and the short-range local wireless network. The seventh step is the at least one telematics access point transmitting the at least one of agricultural machine data and informatics to a back-office server using the cellular telematics modem by way of a telecommunication system.

An advantage of the present invention is that data and informatics may be relayed to a back-office server, which data and informatics may be used for the purpose of increasing efficiency and/or managing vehicle maintenance, as non-limiting examples, without requiring each agricultural or industrial machine or vehicle to have a cellular telematics modem and an active valid subscription for cellular internet access. In this way, the system may minimize the number of cellular telematic modems and active valid subscriptions for cellular internet access needed for localized teams of vehicles. The method and system described herein can be used for any team of off-highway machines or vehicles operating within close proximity and able to form a wireless local network, and for which data and informatics is desired to be collected and/or analyzed at a back-office server.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The term "agricultural machine" is principally used hereinafter for convenience, both in this detailed description section and in the claims that follow, but it is to be understood that this term is not intended to be limiting. Thus "agricultural machine" refers to any of an agricultural machine, an agricultural vehicle, an industrial machine, or an industrial vehicle. Similarly, the term "agricultural fleet" refers to a fleet made up of agricultural machines, agricultural vehicles, industrial machines, and/or industrial vehicles.

Figure 1:
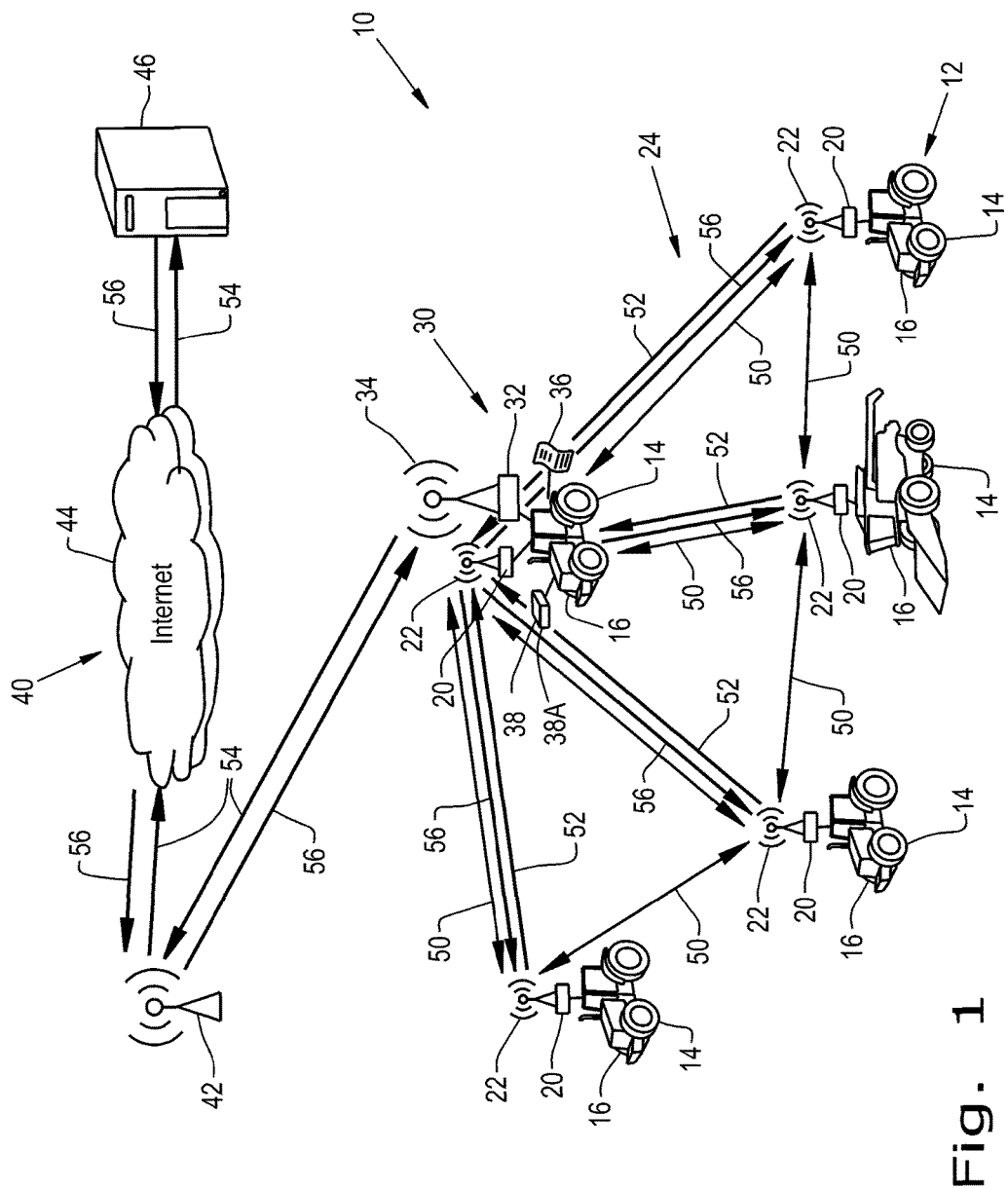
FIG. 1 is a graphical representation of a system for sharing a telematics access point according to an embodiment of the present invention.

Referring now to the drawings, and more particularly to FIG. 1, there is shown a system for sharing a telematics access point 10 according to one embodiment of the present invention. An agricultural fleet 12 is made up of two or more agricultural machines 14, each of which being provided with a short-range wireless connection device 22, which may be a dedicated short-range local wireless network electronic module 20. The short-range wireless connection devices 22 are connected to at least one vehicle electronic system or subsystem 16 of the two or more agricultural machines 14, by way of which connection the short-range wireless connection devices 22 obtain logged or real-time vehicle data and/or informatics 52 from the agricultural machines 14, and/or provide information and/or instructions 56 to the agricultural machines 14. The short-range wireless connection devices 22 of the two or more agricultural machines 14 cooperate with each other to form a short-range local wireless network or self-forming wireless mesh network 24, which may be accomplished using any of several types of short-range electronic communication, including but not limited to Bluetooth, Personal Area Network (PAN), Wireless Sensor Network (WSN), Wireless Local Area Network (WLAN/Wi-Fi), and/or Industrial, Scientific, and Medical (ISM) radio band. Other short-range wireless connection devices contemplated may include forms of non-radio communication, such as infra-red (IR) data communications, as a non-limiting example.

Once the short-range local wireless network or self-forming wireless mesh network 24 has been established, each short-range wireless connection device 22 of the two or more agricultural machines 14 sends a status message 50, informing all of the other agricultural machines 14 of the agricultural fleet 12 whether or not the sending agricultural machine 14 has a cellular telematics modem 34 and an active valid subscription 36 for cellular internet access. Upon exchange of the status messages 50, at least one of the agricultural machines 14 having a cellular telematics modem 34, which may be part of a telematics module 32, and an active valid subscription 36 for cellular internet access is chosen as a telematics access point 30. If more than one of the agricultural machines 14 has a cellular telematics modem 34 and an active valid subscription 36 for cellular internet access, priority may be assigned to a single agricultural machine 14 to act as the telematics access point 30. Alternately, each of the agricultural machines 14 that does not have a cellular telematics modem 34 and/or an active valid subscription 36 for cellular internet access may choose or be assigned one of the agricultural machines 14 that does have a cellular telematics modem 34 and an active valid subscription 36 for cellular internet access to act as its telematics access point 30.

In one embodiment of the present invention, once the agricultural machine or machines 14 is chosen to act as the telematics access point 30, logged or real-time vehicle data and/or informatics 52 is transmitted from each of the other agricultural machines 14 to the telematics access point 30. The agricultural machine or machines 14 chosen to act as the telematics access point 30 may be provided with a means 38 to sort and/or prioritize the logged or real-time vehicle data and/or informatics 52, such as an electronic processor or electronic control unit and/or temporary electronic storage 38A. After receiving the logged or real-time vehicle data and/or informatics 52, and sorting and/or prioritizing the logged or real-time vehicle data and/or informatics 52, as applicable, the telematics access point 30 then transmits the logged or real-time, and/or prioritized and/or sorted vehicle data and/or informatics 54 to physical or stationary electronic and/or computer infrastructure 40 using its cellular telematics modem 34 by way of telecommunication system 42.

The logged or real-time, and/or prioritized and/or sorted vehicle data and/or informatics 54 is then passed to a stationary or back-office server 46 by way of the internet 44. The stationary or back-office server 46 may then process and analyze this data and/or informatics for purposes exemplified but not limited to vehicle and/or load tracking, increasing efficiency, managing vehicle fueling or maintenance, diagnostics, prognostics, and/or compliance and authorization. The stationary or back-office server 46 may then transmit information and/or instructions 56 back to the telematics access point 30 by way of the internet 44, the telecommunication system 42, and the cellular telematics modem 34 of the telematics access point 30. This information and/or instructions 56 may be then transmitted in real-time to the other agricultural machines 14 by way of the short-range wireless connection devices 22 and the short-range local wireless network or self-forming wireless mesh network 24. Alternately, the information and/or instructions 56 may be logged, prioritized, and/or sorted before being sent to the other agricultural machines 14.

In another embodiment of the present invention, the telematics access point 30 functions only to transmit the logged or real-time, and/or prioritized and/or sorted vehicle data and/or informatics 54 received from the other agricultural machine(s) 14 by way of the short-range local wireless network or self-forming wireless mesh network 24 to the stationary or back-office server 46 by way of its cellular telematics modem 34, the telecommunication system 42, and the internet 44. In another embodiment of the present invention, the telematics access point 30 functions only to transmit the logged or real-time, prioritized, and/or sorted information and/or instructions 56 received from the stationary or back-office server 46 by way of the internet 44, the telecommunication system 42, and its cellular telematics modem 34 to the other agricultural machine(s) 14 by way of the short-range local wireless network or self-forming wireless mesh network 24. In another embodiment of the present invention, the agricultural machine(s) 14 other than the agricultural machine 14 acting as the telematics access point 30 are entirely without a cellular telematics modem 34, and rely entirely upon the telematics access point 30 for the transmission of logged or real-time, and/or prioritized and/or sorted vehicle data and/or informatics 54 and for the receipt of logged or real-time, prioritized, and/or sorted information and/or instructions 56.

Figure 2:
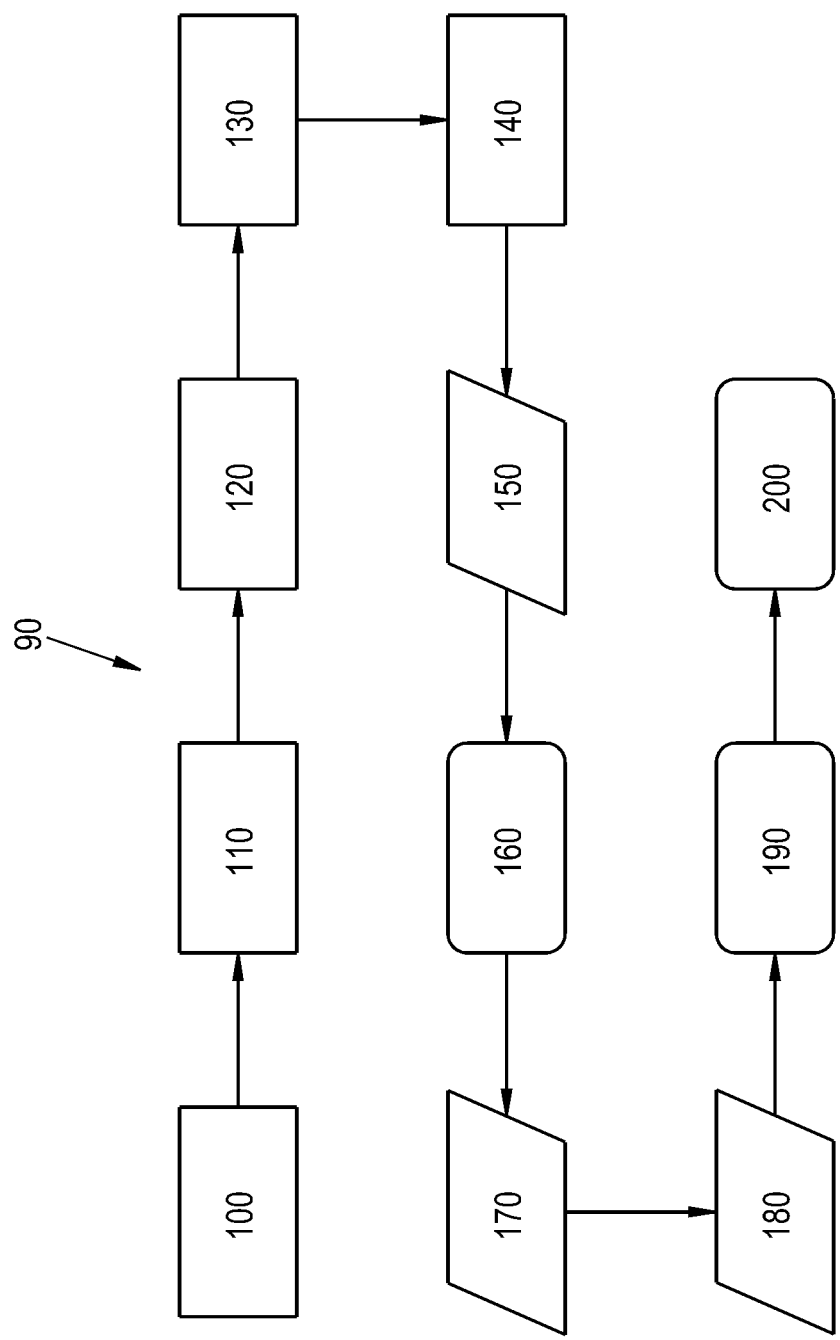
FIG. 2 is a graphical representation of a method for sharing a telematics access point according to an embodiment of the present invention.

Referring now to FIG. 2, a graphical representation of a method for sharing a telematics access point is shown. In the first step 100 of the method, a fleet 12 of agricultural machines 14 is provided with short-range wireless connection devices 22, which may be dedicated short-range local wireless network electronic modules 20, for each of the agricultural machines 14. Each short-range wireless connection device 22 or dedicated short-range local wireless network electronic module 20 is connected to a vehicle electronic system or subsystem 16 of its host agricultural machine 14. In the second step 110, at least one of the agricultural machines 14 is provided with a cellular telematics modem 34, which may be part of a telematics module 32. In a third step 120, the short-range wireless connection devices 22 or dedicated short-range local wireless network electronic modules 20 of the agricultural machines 14 form a short-range local wireless network or self-forming wireless mesh network 24. This step may be accomplished using any of several types of short-range electronic communication, including but not limited to Bluetooth, Personal Area Network (PAN), Wireless Sensor Network (WSN), Wireless Local Area Network (WLAN/Wi-Fi), and/or Industrial, Scientific, and Medical (ISM) radio band. Other short-range wireless connection devices contemplated may include forms of non-radio communication, such as infra-red (IR) data communications, as a non-limiting example.

In a fourth step 130, each short-range wireless connection device 22 of the agricultural machines 14 transmits a status message 50, informing all of the other agricultural machines 14 of the agricultural fleet 12 whether or not the sending agricultural machine 14 has a cellular telematics modem 34 and an active valid subscription 36 for cellular internet access. In a fifth step 140 at least one of the agricultural machines 14 having a cellular telematics modem 34 and an active valid subscription 36 for cellular internet access is chosen as a telematics access point 30. If more than one of the agricultural machines 14 has a cellular telematics modem 34 and an active valid subscription 36 for cellular internet access, priority may again be assigned to a single agricultural machine 14 to act as the telematics access point 30. Alternately, if more than one of the agricultural machines 14 has a cellular telematics modem 34 and an active valid subscription 36 for cellular internet access, each of the agricultural machines 14 that does not have a cellular telematics modem 34 and/or an active valid subscription 36 for cellular internet access may choose or be assigned one of the agricultural machines 14 that does have a cellular telematics modem 34 and an active valid subscription 36 for cellular internet access to act as its telematics access point 30. The choice or assignment of the agricultural machine 14 to be used as a given agricultural machine's 14 telematics access point 30 may be made by one or more algorithms that attempt to establish a largely equal distribution of data and/or vehicle informatics 52 to be transmitted and/or received by the cellular telematics modems 34 of each agricultural machine 14 acting as a telematics access point 30.

In a sixth step 150, each of the agricultural machines 14 that does not have a cellular telematics modem 34 and/or an active valid subscription 36 for cellular internet access transmits logged or real-time vehicle data and/or informatics 52 by way of the short-range local wireless network or self-forming wireless mesh network 24 to its chosen or assigned telematics access point 30. In optional seventh step 160, a means 38 aboard the agricultural machine 14 acting as a telematics access point 30, such as an electronic processor or electronic control unit and/or temporary electronic storage 38A, sorts and/or prioritizes the logged or real-time vehicle data and/or informatics 52. In an eighth step 170, the telematics access point 30 then transmits the logged or real-time, and/or prioritized and/or sorted vehicle data and/or informatics 54 to a stationary or back-office server 46 using its cellular telematics modem 34 by way of telecommunication system 42 and the internet 44.

In a ninth step 180, the stationary or back-office server 46 analyzes the logged or real-time, and/or prioritized and/or sorted vehicle data and/or informatics 54. In an optional tenth step 190, the stationary or back-office server 46 then transmits information and/or instructions 56 back to the telematics access point 30 by way of the internet 44, the telecommunication system 42, and the cellular telematics modem 34 of the telematics access point 30. In optional eleventh step 200, the telematics access point 30 transmits the information and/or instructions 56 in real-time to the other agricultural machines 14 by way of the short-range wireless connection devices 22 and the short-range local wireless network or self-forming wireless mesh network 24. Alternately, the information and/or instructions 56 may be logged, prioritized, and/or sorted by the telematics access point 30, before being sent to the other agricultural machines 14.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for sharing a telematics access point between at least two agricultural machines, comprising:
   a short-range wireless connection device for each of the at least two agricultural machines, said short-range wireless connection devices being connected to at least one agricultural machine electronic system or subsystem;
   said short-range wireless connection devices being configured to create a short-range local wireless network and to transmit status messages from each of the at least two agricultural machines;
   said status messages indicating whether the agricultural machine to which each short-range wireless connection device is connected has a cellular telematics modem and an active valid subscription for cellular internet access;
   at least one telematics access point chosen from at least one of the at least two agricultural machines, the chosen agricultural machine having a cellular telematics modem and an active valid subscription for cellular internet access;
   at least one of the at least two agricultural machines not chosen as said at least one telematics access point not having at least one of a cellular telematics modem and an active valid subscription for cellular internet access;
   said wireless connection devices being further configured to transmit at least one of agricultural machine data and informatics to said at least one telematics access point; and
   said at least one telematics access point being configured to further transmit said at least one of agricultural machine data and informatics to a back-office server using said cellular telematics modem by way of a telecommunication system.

2. The system of claim 1, wherein:
   each of said short-range wireless connection devices of each of the at least two agricultural machines being connected to said at least one agricultural machine electronic system or subsystem of each of the at least two agricultural machines by way of a dedicated short-range local wireless network electronic module.

3. The system of claim 1, wherein:
   said short-range wireless connection devices being further configured to create a self-forming short-range local wireless mesh network using at least one of Bluetooth, a Personal Area Network (PAN), a Wireless Sensor Network (WSN), a Wireless Local Area Network (WLAN or Wi-Fi), or the Industrial, Scientific, and Medical (ISM) radio band of the radio frequency (RF) spectrum.

4. The system of claim 1, wherein:
   said cellular telematics modem of said at least one telematics access point chosen from said at least one of the at least two agricultural machines being connected to said at least one of the at least two agricultural machines by way of a telematics module.

5. The system of claim 1, wherein:
   the at least two agricultural machines further comprising at least three agricultural machines;
   at least two of the agricultural machines having a cellular telematics modem and an active valid subscription for cellular internet access;
   priority being assigned to one of said at least two agricultural machines having a cellular telematics modem and an active valid subscription for cellular internet access to function as said at least one telematics access point.

6. The system of claim 1, wherein:
   the at least two agricultural machines further comprising at least three agricultural machines;
   at least two of the agricultural machines having a cellular telematics modem and an active valid subscription for cellular internet access, and being chosen to function as telematics access points;
   each of said short-range wireless connection devices being further configured to choose or to be assigned to one of said at least two of the agricultural machines being chosen to function as said telematics access points.

7. The system of claim 6, wherein:
   each of said short-range wireless connection devices being further configured to choose or to be assigned to one of said at least two of the agricultural machines being chosen to function as said telematics access points using at least one algorithm that attempts to establish a substantially equal distribution of said agricultural machine data and informatics to be transmitted by said cellular telematics modems of each of said agricultural machines acting as telematics access points.

8. The system of claim 1, wherein:
   said wireless connection devices being further configured to transmit said at least one of agricultural machine data and informatics to said at least one telematics access point as one of logged agricultural machine data or informatics and real-time agricultural machine data or informatics.

9. The system of claim 1, wherein:
   said at least one telematics access point being further configured to at least one of sort and prioritize said at least one of agricultural machine data and informatics prior to transmitting said at least one of agricultural machine data and informatics to said back-office server.

10. The system of claim 1, wherein:
    said at least one telematics access point being further configured to receive at least one of information and instructions from said back-office server using said cellular telematics modem by way of said telecommunication system.

11. A method for sharing a telematics access point between at least two agricultural machines, comprising the steps of:
provinding a short-range wireless connection device for each of the at least two agricultural machines, said short-range wireless connection devices being connected to at least one agricultural machine electronic system or subsystem;
providing at least one of the at least two agricultural machines with a cellular telematics modem and an active valid subscription for cellular internet access;
creating a short-range local wireless network using said short-range wireless connection devices;
transmitting status messages from each of the at least two agricultural machines using said short-range wireless connection devices and said short-range local wireless network, said status messages indicating whether the agricultural machine to which each short-range wireless connection device is connected has a cellular telematics modem and an active valid subscription for cellular internet access;
choosing at least one telematics access point from at least one of the at least two agricultural machines, the chosen agricultural machine having a cellular telematics modem and an active valid subscription for cellular internet access, at least one of the at least two agricultural machines not chosen as said at least one telematics access point not having at least one of a cellular telematics modem and an active valid subscription for cellular internet access;
each of the agricultural machines not chosen as said at least one telematics access point transmitting at least one of agricultural machine data and informatics to said at least one telematics access point using said wireless connection devices and said short-range local wireless network; and
said at least one telematics access point transmitting said at least one of agricultural machine data and informatics to a back-office server using said cellular telematics modem by way of a telecommunication system.

12. The method of claim 11, wherein:
each of said short-range wireless connection devices of each of the at least two agricultural machines being connected to said at least one agricultural machine electronic system or subsystem of each of the at least two agricultural machines by way of a dedicated short-range local wireless network electronic module.

13. The method of claim 11, wherein:
said short-range wireless connection devices further creating a self-forming short-range local wireless mesh network using at least one of Bluetooth, a Personal Area Network (PAN), a Wireless Sensor Network (WSN), a Wireless Local Area Network (WLAN or Wi-Fi), or the Industrial, Scientific, and Medical (ISM) radio band of the radio frequency (RF) spectrum.

14. The method of claim 11, wherein:
said cellular telematics modem of said at least one telematics access point chosen from said at least one of the at least two agricultural machines being connected to said at least one of the at least two agricultural machines by way of a telematics module.

15. The method of claim 11, wherein:
the at least two agricultural machines further comprising at least three agricultural machines;
further comprising the steps of:
providing at least two of the agricultural machines with a cellular telematics modem and an active valid subscription for cellular internet access;
assigning priority to one of said at least two agricultural machines having a cellular telematics modem and an active valid subscription for cellular internet access to function as said at least one telematics access point.

16. The method of claim 11, wherein:
the at least two agricultural machines further comprising at least three agricultural machines;
further comprising the steps of:
providing at least two of the agricultural machines with a cellular telematics modem and an active valid subscription for cellular internet access;
choosing at least two of the agricultural machines with a cellular telematics modem and an active valid subscription for cellular internet access to function as telematics access points;
each of said short-range wireless connection devices choosing or being assigned to one of said at least two of the agricultural machines being chosen to function as said telematics access points.

17. The method of claim 16, further comprising the step of:
using at least one algorithm that attempts to establish a substantially equal distribution of said agricultural machine data and informatics to be transmitted by said cellular telematics modems of each of said agricultural machines acting as telematics access points.

18. The method of claim 11, wherein:
said wireless connection devices further transmitting said at least one of agricultural machine data and informatics to said at least one telematics access point as one of logged agricultural machine data or informatics and real-time agricultural machine data or informatics.

19. The method of claim 11, further comprising the step of:
said at least one telematics access point at least one of sorting and prioritizing said at least one of agricultural machine data and informatics prior to transmitting said at least one of agricultural machine data and informatics to said back-office server.

20. The method of claim 11, further comprising the step of:
said at least one telematics access point receiving at least one of information and instructions from said back-office server using said cellular telematics modem by way of said telecommunication system.

* * * * *